United States Patent [19]

Kitching

[11] 3,908,004

[45] Sept. 23, 1975

[54] PROCESS FOR MAKING INJECTABLE IRON COMPOSITIONS FOR TREATING IRON-DEFICIENCY ANEMIA

[75] Inventor: John Metcalfe Kitching, Fleet, England

[73] Assignee: C. L. (Basingstoke) Limited, Basingstoke, England

[22] Filed: Dec. 8, 1972

[21] Appl. No.: 313,277

Related U.S. Application Data

[63] Continuation-in-part of Ser. No. 39,180, May 20, 1970, abandoned.

[52] U.S. Cl. ............................................. 424/180
[51] Int. Cl.² ........................................ A61K 31/70
[58] Field of Search ..................................... 424/180

[56] References Cited
UNITED STATES PATENTS

| | | |
|---|---|---|
| 2,820,740 | 1/1958 | London et al. ..................... 424/180 |
| 3,076,798 | 2/1963 | Mueller et al. ..................... 424/180 |
| 3,093,545 | 6/1963 | Westfall et al. ..................... 424/180 |

*Primary Examiner*—V. D. Turner
*Attorney, Agent, or Firm*—Schuyler, Birch, Swindler, McKiet & Beckett

[57] ABSTRACT

This invention provides a method of making an iron-containing composition to be injected for the treatment of iron-deficiency anaemia. In carrying out the method, a monosaccharide or an oligosaccharide is polymerised and the polymerised product is heated with an aqueous alkali and the mixture is separated into two or more fractions of different molecular weight. A fraction is then selected containing the desired polysaccharide and these are reacted with a water soluble inorganic iron compound.

9 Claims, No Drawings

PROCESS FOR MAKING INJECTABLE IRON COMPOSITIONS FOR TREATING IRON-DEFICIENCY ANEMIA

This application is a continuation-in-part of application Ser. No. 39,180 filed May 20, 1970 now abandoned.

The invention relates to iron compositions suitable for administration by injection in the treatment of iron-deficiency anaemia.

Low molecular-weight iron compounds in which the iron is readily avilable in the ionic form have been found to be unsuitable because of their toxicity, and ineffective when the iron is more firmly bound. Compounds of iron with polymeric substances have been suggested but it is difficult to obtain such compounds which satisfy the clinical requirements of low toxicity, good haematinic response, high stability, isotonicity and low viscosity. These requirements are to a large extent satisfied in complexes of iron with certain synthetic polysaccharides such as polyglucose and polygalactose and it is the purpose of this invention to describe such complexes. In these complexes the degree of polymerisation of the polysaccharide is important. Solutions of iron complexes of low molecular-weight polymers are ineffective, and those of high molecular-weight polymers are too viscous for normal injection. Iron complexes of intermediate molecular-weight polymers are more suitable and it has been found that the most satisfactory polymers for this purpose are those having 5 – 10% of the reducing power towards Fehling's solution of pure glucose. (The method of using Fehling's solution for the estimation of reducing sugars is well-known and is, for example, described in "Practical Organic Chemistry" by J. B. Cohen, 1937, pages 320 – 321, and "Quantitative Organic Analysis" by J. S. Fritz and G. S. Hammond, 1957, page 92). However, compositions containing such complexes which have been prepared in the past although satisfying some of the requirements of a good haematinic agent have not been altogether satisfactory because in use they have sometimes produced undesirable side-effects, such as oedema.

One object of the invention is the provision of compositions containing iron-polysaccharide complexes which are effective in the treatment of iron deficiency anaemia and which produce fewer undesirable side-effects when administered by injection than known compositions of this type. This may be done by incorporating into the manufacturing process one or more steps which reduce the percentage of polysaccharides of unsuitable molecular weight in the compositions.

An essential part of the preparation is to heat an aqueous alkaline solution of the polysaccharide with a water soluble inorganic iron compound. The presence of the alkali is necessary to bring about the formation of the complex. However, the alkaline conditions also cause some degradation of the polysaccharide and the low molecular-weight species so formed produce iron compounds which are responsible for undesirable effects.

An important part of the invention which contributes to the selection of suitable molecular weight species is to treat the polysaccharide with aqueous alkali before combining it with the iron and to remove the low molecular weight degradation products in the supernatant liquor during the subsequent precipitation of the desired product.

According to this invention a method of making a composition for administration by injection in the treatment of iron-deficiency anaemia comprises the steps of:
1. Polymerising a monosaccharide or an oligosaccharide with or without acid catalysis to form a mixture of polymers of different molecular weights,
2. Heating with aqueous alkali and separating the mixture into two or more fractions according to molecular weight,
3. Selecting from these fractions a fraction containing polysaccharides of a particular range of molecular weights such that when this fraction is allowed to react with a water soluble inorganic iron compound there is obtained a mixture of substantially non-toxic complexes the aqueous solution of which is not viscous to preclude administration by injection.

Another feature of the invention is the provision of a composition prepared by this method.

The polysaccharides may be prepared from glucose or galactose and the iron compound may be ferric oxychloride.

The separation into suitable molecular weight fractions may be carried out by selectively precipitating aqueous solutions of the polymers with water miscible organic solvents. Acetone is a suitable solvent for this purpose.

The method of carrying out the invention will now be described by way of examples:

EXAMPLE 1

20 ml. of dilute sulphuric acid (0.01 N) is added by pipette to 49.5 g. glucose monohydrate, the glucose monohydrate thus containing 0.02 per cent w/w of sulphuric acid. The volume of dilute acid used is just sufficient to wet the glucose monohydrate thoroughly and to ensure that the sulphuric acid catalyst is adequately distributed throughout its bulk. This mixture is heated at 150° C. under a reduced pressure of 10 mm. Hg. for a period of 1.5 hours when voluminous frothing caused by rapid evaporation of water vapour occurs.

The vacuum is released and the mixture solidified by cooling to a temperature of 25°C. and ground to a course powder which is more easily submitted to further heat treatment for removal of water. The ground material is reheated at 150°C. under a reduced pressure of 10 mm. Hg. After 60 minutes of heating, samples are taken at intervals of 30 minutes and tested for their reducing value using Fehling's solution, standardised by titration against an aqueous solution of pure glucose (5 g. per litre). When the reducing value is 5 per cent of that of pure glucose, the powder having been heated for a total of 150 minutes, the product is cooled to 25°C. and solidifies.

The pH of a 30 per cent w/v solution of the glucan is adjusted to 10.5 with sodium hydroxide solution and the mixture heated to 80°C. The mixture is maintained at this temperature for 4 hours, during which time the pH is kept between 10.0 and 10.5 m by further additions of sodium hydroxide solutions. The cooled product is diluted with water so that it contains 15 per cent w/v of the original glucan and acetone is added slowly with stirring until 5 per cent of the glucan has been precipitated. This fraction, which is precipitated as a syrup, contains some of the higher molecular weight species and is rejected.

Acetone is added slowly to the stirred supernatant until three volumes of acetone have been added per volume of aqueous solution taken. The supernatant from this precipitation contains some of the low molecular weight species which are not required for the iron preparation and is discarded.

The middle fraction of the glucan which is a syrup is mixed with ferric oxychloride in the ratio of one part by weight of elemental iron to five parts by weight of glucan. The pH is adjusted to 10.5 with sodium hydroxide solution and the mixture heated to 80° C. The heating is continued for 2 hours. Evaporation is allowed to proceed during the heating.

The pH is adjusted to 8.0 with hydrochloric acid and the complex precipitated by adding acetone slowly to the stirred solution. The volume of the solution is such that an equal volume of acetone will precipitate the complex. The precipitated complex is dissolved in water and reprecipitated using acetone as before.

The complex from the second precipitation is dissolved in water and evaporated by heating under vacuum to strip off any acetone, until the volume is reduced to 75 per cent and the iron content is just above 10 per cent w/v.

Phenol is added as a preservative in the proportion of 0.55 grams of phenol for every 10 grams of iron and the pH adjusted to 8.0. The solution is diluted to 10.0 per cent w/v iron, vialled and sterilized at 100° C. for 20 minutes.

EXAMPLE 2

The procedure of the first example is carried out except that the heating of the glucan solution with alkali is maintained for only 2 hours and the pH is not adjusted during the heating.

EXAMPLE 3

The procedure of the second example is followed except that a galactan is used in place of the glucan. The galactan is prepared by heating pure galactose at 185° C. under vacuum until the Fehling's reducing value of the product is 9 per cent of that of pure glucose.

By a substantially non-toxic complex we mean a complex in which $LD_{50}$ for a single dose for mice is substantially greater than the recommended dose.

Although the invention has been described above using glucose and galactose as starting materials, other sugars may alternatively be used, for example arabinose, rhamnose, mannose, sorbose, xylose, lactose, sucrose and raffinose.

What is claimed is:

1. A method of making a composition for administration by injection in the treatment of iron-deficiency anaemia comprising the steps of:
   a. forming a mixture of polymers of different molecular weight by polymerising a monosaccharide or an oligosaccharide by heating it in the presence of an acid catalyst until the reducing value (determined with Fehling's solution) of the polymers produced is from about 5–10 percent of that of pure glucose,
   b. heating the mixture of polymers with aqueous alkali to form low molecular weight degradation products,
   c. separating the resultant mixture of polymers from step (b) into several separate fractions by:

adding to the mixture obtained in step (b) a first increment of a water miscible organic solvent, said solvent being capable of separating said mixture by precipitating said polymers in stages, said first increment being added in an amount sufficient to separate a first high molecular weight fraction which comprises about 5% of the polymers, removing said high molecular weight fraction and adding to said mixture a second increment of said organic solvent in an amount sufficient to separate the mixture into a middle molecular weight fraction which is precipitated as a syrup and which when reacted with a water soluble organic iron compound is capable of producing a mixture of substantially non-toxic complexes the aqueous solution of which is not too viscous to preclude administration by injection, and a low molecular weight fraction which is soluble in the supernatant, forms iron complexes having undesirably toxic side effects, and is discarded, and d. reacting the fraction containing polysaccharides of the desired middle molecular weight range with a water soluble iron compound in the presence of alkali to produce a mixture of substantially non-toxic complexes the aqueous solution of which is not too viscous to preclude administration by injection.

2. The method of claim 1 wherein the monosaccharide or oligosaccharide is selected from the group consisting of glucose and galactose.

3. The method of claim 1 wherein the monosaccharide or oligosaccharide is selected from the group consisting of arabinose, rhamnose, mannose, sorbose, xylose, lactose, sucrose and raffinose.

4. The method according to claim 2 wherein the inorganic compound is ferric oxychloride.

5. The method according to claim 3 wherein the inorganic compound is ferric oxychloride.

6. The method of claim 2 wherein the solvent is acetone.

7. The method of claim 3 wherein the solvent is acetone.

8. The composition made by the process of claim 1.

9. A method of making a composition for administration by injection in the treatment of iron deficiency anaemia comprising:
   a. polymerizing a monosaccharide or oligosaccharide by
      i. adding sulphuric acid as a dilute solution to a large excess of glucose monohydrate,
      ii. heating the resultant mixture to about 150°C. under reduced pressure until frothing occurs,
      iii. cooling the frothed mixture,
      iv. grinding the cooled mixture to a powder,
      v. reheating the ground material to about 150°C. under reduced pressure until the reducing value (determined with Fehling's solution) of the polysaccharide produced is about 5 percent of that of pure glucose,
   b. heating a solution of said polysaccharide with alkali at a temperature of about 80°C. and a pH of between 10.0 and 10.5 whereby the alkali degrades some of the polysaccharide and a mixture of molecular weights is formed,
   c. separating the resultant mixture of polysaccharides from step (b) into several separate fractions by:

adding to the mixture obtained in step (b) a first increment of a water miscible organic solvent, said solvent being capable of separating said mixture by precipitating said polysaccharides in stages, said first increment being added in an amount sufficient to separate a first high molecular weight fraction which comprises about 5% of the polysaccharides, removing said high molecular weight fraction and adding to said mixture a second increment of said organic solvent in an amount sufficient to separate the mixture into a middle molecular weight fraction which is precipitated as a syrup and which when reacted with a water soluble organic iron compound is capable of producing a mixture of substantially non-toxic complexes the aqueous solution of which is not too viscous to preclude administration by injection, and a low molecular weight fraction which is soluble in the supernatent, forms iron complexes having undesirably toxic side effects, and is discarded, and d. reacting the fraction containing polysaccharides of the desired middle molecular weight range with a water soluble iron compound in the presence of alkali to produce a mixture of substantially non-toxic complexes the aqueous solution of which is not too viscous to preclude administration by injection.

* * * * *